US011403814B2

(12) United States Patent
Winkle et al.

(10) Patent No.: US 11,403,814 B2
(45) Date of Patent: Aug. 2, 2022

(54) SYSTEMS, DEVICES, AND METHODS FOR GENERATING A DYNAMIC THREE DIMENSIONAL COMMUNICATION MAP

(71) Applicant: Walmart Apollo, LLC, Bentonville, AR (US)

(72) Inventors: David Winkle, Bella Vista, AR (US); John Jeremiah O'Brien, Farmington, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 16/053,971

(22) Filed: Aug. 3, 2018

(65) Prior Publication Data

US 2019/0043251 A1    Feb. 7, 2019

Related U.S. Application Data

(60) Provisional application No. 62/541,140, filed on Aug. 4, 2017.

(51) Int. Cl.
*G06T 17/05* (2011.01)
*G08G 5/00* (2006.01)
(Continued)

(52) U.S. Cl.
CPC ............ *G06T 17/05* (2013.01); *B64C 39/024* (2013.01); *G08G 5/006* (2013.01); *G08G 5/0013* (2013.01);
(Continued)

(58) Field of Classification Search
None
See application file for complete search history.

(56) References Cited

U.S. PATENT DOCUMENTS

| 4,818,990 A | 4/1989 | Fernandes |
| 6,871,139 B2 | 3/2005 | Liu et al. |

(Continued)

FOREIGN PATENT DOCUMENTS

| WO | 2016154939 A1 | 10/2016 |
| WO | 2016154942 A1 | 10/2016 |

(Continued)

OTHER PUBLICATIONS

U.S. Appl. No. 16/053,983, filed Aug. 3, 2018.

(Continued)

*Primary Examiner* — Jeffrey J Chow
(74) *Attorney, Agent, or Firm* — Fitch, Even, Tabin & Flannery LLP

(57) ABSTRACT

Methodologies, systems, and computer-readable media are provided for generating a dynamic 3D communication map. Data is collected from a number of autonomous drones as they navigate through a particular area. The autonomous drones can collect environmental data, location data, signal strength data, signal usability data, etc. and transmit that data back to a computing system. The computing system analyzes the data received from the autonomous drones and generates a dynamic 3D communication map that indicates the signal strength and/or the signal usability of various wireless communication signals as a function of time and other variables.

19 Claims, 10 Drawing Sheets

(51) Int. Cl.

| | | |
|---|---|---|
| *H04B 17/318* | (2015.01) | |
| *H04B 17/345* | (2015.01) | |
| *H04W 4/02* | (2018.01) | |
| *B64C 39/02* | (2006.01) | |
| *H04W 16/18* | (2009.01) | |
| *H04B 17/373* | (2015.01) | |
| *H04B 17/391* | (2015.01) | |
| *H04W 24/08* | (2009.01) | |
| *H04B 17/27* | (2015.01) | |

(52) U.S. Cl.
CPC ......... *G08G 5/0026* (2013.01); *G08G 5/0034* (2013.01); *G08G 5/0069* (2013.01); *G08G 5/0086* (2013.01); *G08G 5/0091* (2013.01); *H04B 17/27* (2015.01); *H04B 17/318* (2015.01); *H04B 17/345* (2015.01); *H04B 17/373* (2015.01); *H04B 17/3913* (2015.01); *H04W 4/025* (2013.01); *H04W 16/18* (2013.01); *H04W 24/08* (2013.01); *B64C 2201/125* (2013.01); *B64C 2201/141* (2013.01)

(56) References Cited

U.S. PATENT DOCUMENTS

| | | | |
|---|---|---|---|
| 7,765,038 | B2 | 7/2010 | Appleby et al. |
| 8,473,118 | B2 | 6/2013 | Gottifredi et al. |
| 9,191,303 | B2 | 11/2015 | Fuste Vilella et al. |
| 9,266,610 | B2 | 2/2016 | Knapp et al. |
| 9,363,690 | B1 | 6/2016 | Singh et al. |
| 9,513,627 | B1 | 12/2016 | Elazary et al. |
| 9,513,635 | B1 | 12/2016 | Bethke et al. |
| 9,557,183 | B1 | 1/2017 | Ross et al. |
| 9,646,502 | B1 | 5/2017 | Gentry |
| 9,849,978 | B1 * | 12/2017 | Carmack ............... G08G 5/0013 |
| 10,586,464 | B2 * | 3/2020 | Dupray ................. G08G 5/0043 |
| 2007/0063834 | A1 | 3/2007 | Bozzone et al. |
| 2008/0102809 | A1 | 5/2008 | Beyer |
| 2008/0247310 | A1 | 10/2008 | Ruffini et al. |
| 2010/0036604 | A1 | 2/2010 | O'Connell et al. |
| 2011/0066379 | A1 | 3/2011 | Mes |
| 2013/0157579 | A1 | 6/2013 | Horton et al. |
| 2013/0325326 | A1 | 12/2013 | Blumenberg et al. |
| 2014/0316616 | A1 | 10/2014 | Kugelmass |
| 2015/0142211 | A1 | 5/2015 | Shehata et al. |
| 2015/0197010 | A1 | 7/2015 | Ruuspakka et al. |
| 2015/0304885 | A1 | 10/2015 | Jalali |
| 2015/0356482 | A1 | 12/2015 | Whipple et al. |
| 2016/0140851 | A1 | 5/2016 | Levy et al. |
| 2016/0189549 | A1 | 6/2016 | Marcus |
| 2016/0232794 | A1 | 8/2016 | Hafeez et al. |
| 2016/0260328 | A1 | 9/2016 | Mishra et al. |
| 2016/0280370 | A1 | 9/2016 | Canavor et al. |
| 2016/0307447 | A1 | 10/2016 | Johnson et al. |
| 2016/0328979 | A1 | 11/2016 | Postrel |
| 2016/0360562 | A1 | 12/2016 | Chong et al. |
| 2016/0363929 | A1 | 12/2016 | Clark et al. |
| 2016/0371985 | A1 | 12/2016 | Kotecha |
| 2017/0025021 | A1 * | 1/2017 | Song .................... G08G 5/0013 |
| 2017/0164423 | A1 | 6/2017 | Ross et al. |
| 2017/0295609 | A1 * | 10/2017 | Darrow .................. G05D 1/104 |
| 2017/0358228 | A1 * | 12/2017 | Priest .................. G08G 5/0039 |
| 2018/0004207 | A1 | 1/2018 | Michini |
| 2018/0017973 | A1 | 1/2018 | Teague |
| 2018/0103036 | A1 | 4/2018 | Fox |
| 2018/0244386 | A1 * | 8/2018 | Phan ..................... B64C 39/024 |
| 2018/0267543 | A1 * | 9/2018 | McGuire, Jr. .......... G08G 5/006 |
| 2018/0292826 | A1 | 10/2018 | Defelice |
| 2018/0292844 | A1 | 10/2018 | Kosseifi |
| 2018/0293897 | A1 * | 10/2018 | Murphy ............... G05D 1/0022 |
| 2018/0307892 | A1 | 10/2018 | Tatourian |
| 2018/0348748 | A1 | 12/2018 | Dowlatkhah |
| 2018/0356840 | A1 | 12/2018 | Ham |
| 2019/0011935 | A1 | 1/2019 | Ham |
| 2019/0135113 | A1 | 5/2019 | Koo |
| 2019/0176985 | A1 | 6/2019 | Mucci |
| 2019/0202530 | A1 | 7/2019 | Rikoski |
| 2019/0265705 | A1 * | 8/2019 | Zhang .................. G05D 1/0088 |
| 2019/0364492 | A1 * | 11/2019 | Azizi .................... H04W 48/16 |
| 2019/0383464 | A1 | 12/2019 | Raleigh |
| 2020/0008059 | A1 | 1/2020 | Fox |
| 2020/0026720 | A1 * | 1/2020 | Liu ........................ G01S 13/89 |

FOREIGN PATENT DOCUMENTS

| | | |
|---|---|---|
| WO | 2016210432 A1 | 12/2016 |
| WO | 2017095036 A1 | 6/2017 |
| WO | 2019028333 A1 | 2/2019 |
| WO | 2019028356 A1 | 2/2019 |
| WO | 2019028380 A1 | 2/2019 |

OTHER PUBLICATIONS

U.S. Appl. No. 16/053,993, filed Aug. 3, 2018.
U.S. Appl. No. 16/054,002, filed Aug. 3, 2018.
Chantz, Hy, Using Blockchain to Address Drone Cybersecurity, https://securityintelligence.com/usingblockchaintoaddressdronecybersecurity/, Aug. 25, 2016.
International Search Report and Written Opinion from related International Patent Application No. PCT/US/18/45210 dated Oct. 2, 2018.
International Search Report and Written Opinion from related International Patent Application No. PCT/US/18/45141 dated Oct. 3, 2018.
International Search Report and Written Opinion from related International Patent Application No. PCT/US/18/45174 dated Oct. 3, 2018.
International Search Report and Written Opinion from related International Patent Application No. PCT/US/18/45220 dated Oct. 3, 2018.
USPTO; U.S. Appl. No. 16/053,983; Notice of Allowance and Fees Due (PTOL-85) dated Feb. 6, 2020; (pp. 1-9).
USPTO; U.S. Appl. No. 16/054,002; Non-Final Office Action dated Mar. 12, 2020; (pp. 1-18).
USPTO; U.S. Appl. No. 16/054,002; Notice of Allowance and Fees Due (PTOL-85) dated Jul. 1, 2020; (pp. 1-5).
USPTO; U.S. Appl. No. 16/053,993; Final Office Action dated Sep. 21, 2020; (pp. 1-16).
USPTO; U.S. Appl. No. 16/053,993; Non-Final Office Action dated Feb. 14, 2020; (pp. 1-15).

\* cited by examiner

SYSTEMS, DEVICES, AND METHODS FOR GENERATING A DYNAMIC THREE DIMENSIONAL COMMUNICATION MAP

CROSS-REFERENCE TO RELATED PATENT APPLICATIONS

This application claims priority to U.S. Provisional Application No. 62/541,140 filed on, Aug. 4, 2017, the content which is hereby incorporated by reference in its entirety.

BACKGROUND

Various types of robots and delivery vehicles can be programmed to travel autonomously. Autonomous vehicles may be ground-based or aerial vehicles. The autonomous vehicles may be configured for wireless communication during transit.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present invention will be more fully understood from the following description of exemplary embodiments when read together with the accompanying drawings, in which.

DETAILED DESCRIPTION

Figure 1:
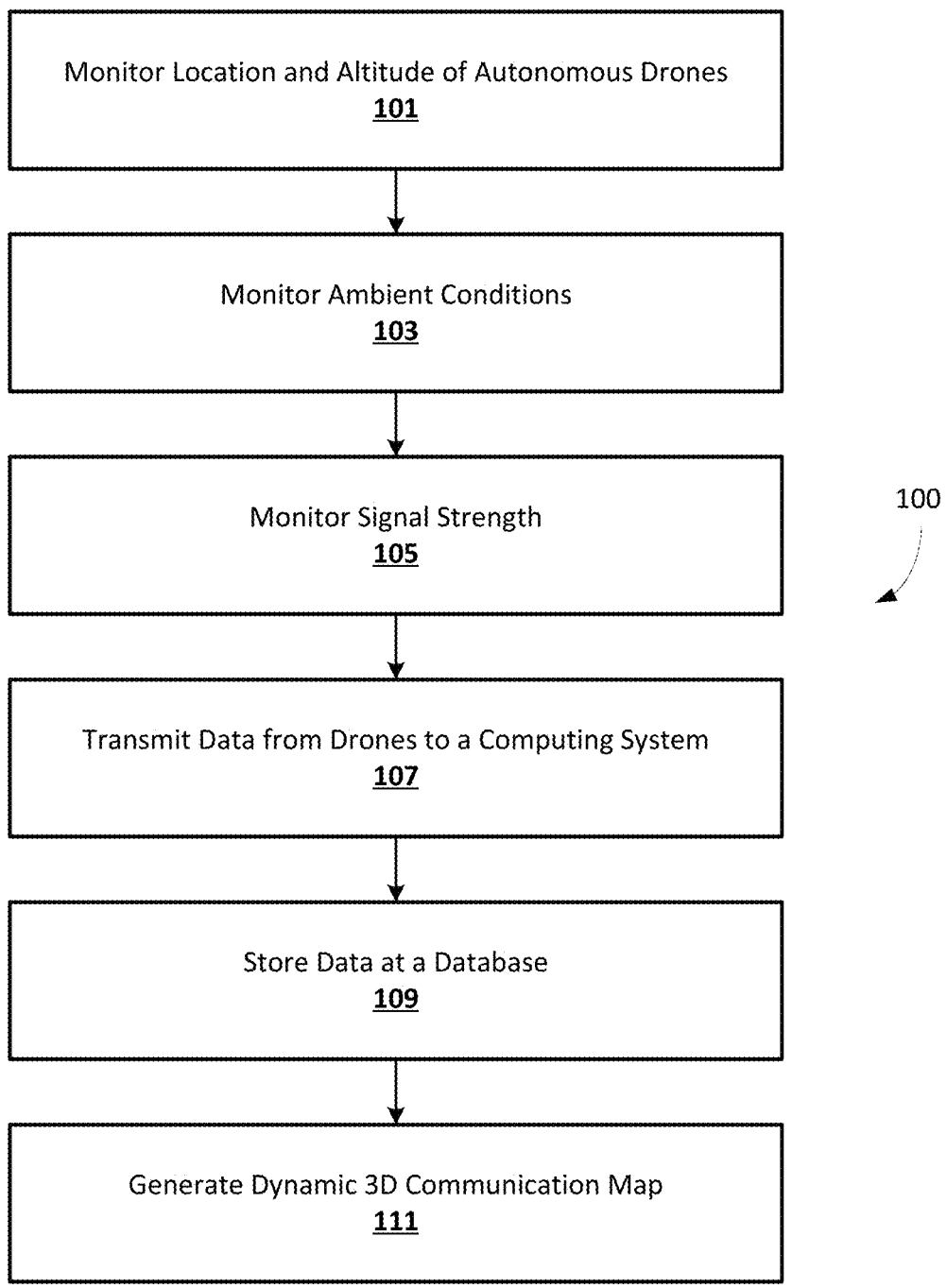
FIG. 1 is a flowchart illustrating an exemplary method for monitoring packages with affixed sensors, according to an exemplary embodiment.

Following below are more detailed descriptions of various concepts related to, and embodiments of, inventive methods, apparatus, and systems for associating delivery information with a remotely located package. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means "includes but is not limited to", the term "including" means "including but not limited to". The term "based on" means "based at least in part on".

Conventional maps can indicate the location of landmarks and structural features, and some maps can provide an indication of pre-measured wireless signal strength values, but they are unable to indicate the usability of the wireless signals or update the values in real-time. Exemplary embodiments of the present disclosure facilitate generating a dynamic 3D communication map that can respond to real-time changes in signal strength and signal usability. Some embodiments involve the generation of navigation routes and communication routes based on the dynamic 3D communication map.

In exemplary embodiments, a dynamic 3D communication map can be generated by collecting data from a number of autonomous drones as they navigate through a particular area. The autonomous drones can collect environmental data, location data, signal strength data, signal usability data, etc. and transmit that data back to a computing system. In some embodiments, that data can be received at the computing system and analyzed in real-time and used to generate a dynamic 3D communication map that can indicate the signal strength and the signal usability of various wireless communication signal types as a function of time, season, weather patterns, etc. In some embodiments, vector analysis can be used to identify obstacles that may obstruct wireless signals and generate acceptable regions or pathways within the dynamic 3D communication map where ideal signal strength and/or usability can be found. For example, the 3D communication map can be a vector map that takes into account signal attenuation due to ambient conditions, structural features, traffic patterns, population density, etc. In some embodiments, the positioning of an autonomous drone, the positioning of obstacles or objects detected by the drone's sensors, and/or the attenuation or signal strength of a signal can be determined based on the proximity to a data communication tower. In some embodiments, the autonomous drone can identify a communication tower, identify the tower's known location, and compare the location against the strength of the signal received from the communication tower in order to determine signal strength and/or the location of the drone.

In one example embodiment, partial line-of-sight blocking of a signal can be caused by vehicles temporarily blocking a signal path to an autonomous drone, which can result in attenuation of the signal. In response to such an attenuation, the autonomous drone can fly at a higher altitude and transmit information to the computing system that a particular type of signal is attenuated at a particular altitude. This attenuation data can be incorporated into the dynamic 3D communication map described herein. In some embodiments, the 3D communication map can serve as a model to predict signal strength and/or signal usability as conditions change, such as temperature, humidity, season, vegetation growth, population density, etc. Various types of vehicles or autonomous drones can be deployed to gather information in order to generate the dynamic 3D communication map, such as drones, cars, buses, automated ground vehicles, boats, planes, helicopters, etc. In some embodiments, the dynamic 3D communication map identifies areas or routes of high or low signal strength or signal usability. These areas or routes can be used to help generate navigation routes and/or communication routes in order to maximize the time that autonomous drones can communicate with a central computing system or the time available to relay communications between different autonomous drones.

In some embodiments, the altitude of an autonomous drone can be determined using an altimeter, such as a laser, or a barometer. The speed or velocity of an autonomous drone can be determined using an accelerometer, and the orientation of an autonomous drone can be determined using a gyroscope or an accelerometer. In some embodiments, the positioning of an autonomous drone can be determined using a magnetometer, compass, or GPS technology.

In one embodiment, a system relays communications using autonomous drones. According to some embodiments, a computing system can generate an initial communication route in order to relay a message packet from an initial location to a destination location using a subset of autonomous drones. In one embodiment, each drone, starting from the initial location, will relay the message packet to a predetermined subsequent drone until the message packet has arrived at the destination location. The message packet can include various communication route update rules for dynamically updating the communication route. For example, an updated communication route may be needed when there are changes in signal strength between autonomous drones or when one drone in the relay chain is missing or loses power. In such instances, the update rules can generate an updated communication route in order to relay the communication along to the destination location using a different subset of drones. In some embodiments, one or more of the autonomous drones can communicate with a database or central server in order to determine which drones are available to receive and relay the message packet, or the drones can communicate among each other in order to determine an updated communication route. If sufficient drone density exists between the initial location and the destination location, a different set of drones can be used for outbound and inbound messages. In some embodiments, authentication between each autonomous drone can be accomplished using blockchain and public/private key exchanges. For example, the system can use a set of tokens that can accompany the messages. A token can be received by an intermediate node or drone and direct the drone actions. The token can contain a set of parameters which can tell the drone when to forward the message, what to do if the next target does not acknowledge receipt, etc. In the event that a drone is out of communication, the system can cache and forward messages when a more reliable communication path is available.

In additional exemplary embodiments, vehicle routes can be generated based on the dynamic 3D communication map disclosed herein. In some embodiments, data related to the signal strength and/or the signal usability of various wireless communication signal types can be gathered from the dynamic 3D communication map, or a database associated with the dynamic 3D communication map. A low signal strength zone or a low signal usability zone can be identified using the dynamic 3D communication map, and an initial navigation route can be generated in order to guide the autonomous drone to avoid such zones or minimize the amount of time spent in the zones. The initial navigation route can be transmitted to the autonomous drone, and the autonomous drone can begin traveling along that route. Updated wireless signal strength data or wireless signal usability data can be received while the drone is in transit, and an updated navigation route can be generated in order to avoid a new low signal strength or low signal usability zone. This updated navigation route can then be transmitted to the autonomous drone, thus redirecting the drone in real-time based on dynamic changes in signal strength and/or signal quality.

In additional exemplary embodiments, the dynamic 3D communication map can include information related to the communication signal configuration. The communication signal configuration can include, in some embodiments, which provider or carrier is transmitting the communication signal, whether the communication signal is a cellular or Wi-Fi signal, or which antenna configuration is needed for a particular communication signal. User densities may vary by provider, causing changes in the strength and/or usability of a signal. In some embodiments, signal strength and/or usability may vary based on whether a particular drone is configured for a particular communication protocol (e.g., 2G, 3G, 4G, CDMA, GSM, LTE, etc.). For example, a drone configured to use a particular wireless carrier's Wi-Fi radio and antenna configurations may have different requirements than a drone manufactured by a different carrier or configured to be compatible with a different carrier's communication signals. In some embodiments, usability by provider or carrier may vary by location as a result of advertising or promotional campaigns. The presence of user-deployed repeaters can also impact the signal strength and usability of a particular wireless communication signal type or of a particular provider or carrier. In some embodiments, this information can be used to generate a navigation route, communication route, or to optimize configurations for a particular signal type to include selection of a provider configuration, antenna type or characteristics, radio sensitivity, channel, transmission power levels, etc. For example, it may be beneficial to configure a drone to use a particular cellular provider configuration within a particular area.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an exemplary method 100 for generating a dynamic 3D communication map, according to an exemplary embodiment. It will be appreciated that the method is programmatically performed, at least in part, by one or more computer-executable processes executing on, or in communication with one or more servers or other computing devices such as described further below. In step 101, the location and altitude of a number of autonomous drones is monitored using location and altitude sensors associated with each drone. Each of the autonomous drones is configured to travel along a predetermined route and generates location and altitude data, using the location and altitude sensors, as it travels along the predetermined route. In some embodiments, the location and altitude sensors associated with the autonomous drones can include, for example, altimeters, accelerometers, barometers, GPS sensors, or other suitable geolocation sensors. The location of the autonomous drones can also be calculated based on the strength of wireless communication signals received from a cell tower or other signal source.

In step 103, ambient condition data is generated by monitoring ambient conditions using ambient condition sensors with which the drones are equipped including, but not limited to, one or more of barometers, radar, lidar, sonar, anemometers, light sensors, humidity sensors and temperature sensors. In exemplary embodiments, the ambient conditions can include weather data, data relating to geographical and structural features located along the predetermined routes, temperature data, humidity data, seasonal data, vegetation growth, wind speed, or air pressure. The ambient condition data can also include, for example, optical data depicting fog, clouds, buildings, vegetation, traffic or population density, etc. In some embodiments, a barometer can monitor atmospheric pressure and also calculate the altitude of the autonomous drone.

In step 105, communication signal strength data is generated by monitoring the signal strength associated with one or more wireless communication signal types using communication signal sensors associated with each drone. In exemplary embodiments, the wireless communication signal types can include Wi-Fi, cellular, Bluetooth, WiMAX, etc. In some embodiments a carrier-to-interference plus noise ratio (CINR) for WiMAX communications can be calculated and used as an indicator of signal strength. For GPS or Differential GPS (D-GPS) signals, a satellite tower provisioning number (measured in number of active satellite connections) can be used as an indicator of signal strength, in some embodiments. For LTE signals, a signal-to-interference plus noise ratio (SINR) can be used as an indicator of signal strength, in some embodiments. For High Speed Packet Access Plus (HSPA+) and Evolution-Data Optimized (EVDO) communication signals, signal strength can be measured in decibels/milliwatt (dBM), and signal quality can be measured in decibels (dB), in some embodiments. In Table 1 below, a listing of exemplary signal strength and signal quality ranges is provided for HSPA+, EVDO, LTE, GPS/D-GPS, and WiMAX communication signals.

system can also receive wireless communication signal type data from the autonomous drones that can indicate whether a particular wireless communication signal type, such as a cellular signal or WiFi, is associated with a particular low signal strength zone. This information can be used to determine which particular type of wireless signal will provide the best signal strength coverage for that zone, in some embodiments.

In step 109, the computing system stores the location data, altitude data, ambient condition data, and communication signal strength data in a database. In some embodiments, the computing system can update existing values within the database to reflect new data received from the autonomous drones in order to maintain a dynamic and current database.

In step 111, the computing system generates a dynamic 3D communication map using a 3D map generation module that includes one or more computer-executable processes. The dynamic 3D communication map indicates the signal strength for each of the one or more wireless communication signal types as a function of the location data, altitude data, and ambient condition data received from the autonomous drones. In some embodiments, the dynamic 3D communication map can indicate changes in signal strength that occur as a result of weather patterns, seasonal changes, temporary signal outages, or other real-time changes in signal strength that are detected by the sensors of the autonomous drones. In exemplary embodiments, the 3D communication map can be dynamic in that the computing system can continuously receive real-time data from the autonomous drones and dynamically update the 3D communication map in response to the newly received data.

In some embodiments, the 3D communication maps disclosed herein can be displayed using, for example, an electronic device 903 as described in more detail below in

TABLE 1

|  | EVDO/HSPA+ Signal Strength | EVDO/HSPA+ Signal Quality | LTE SINR | GPS/D-GPS Satellite Tower Provisioning | WiMAX CINR |
|---|---|---|---|---|---|
| Excellent | 0 to −65 dBM | 0 to −2 dB | 0 to −2 dB | >10 active connections | >22 dB |
| Good | −65 to −75 dBM | −2 to −5 dB | −2 to −5 dB | 7 to 10 | 16 to 22 dB |
| Fair | −75 to −85 dBM | −5 to −10 dB | −5 to −10 dB | 5 to 7 | 9 to 16 dB |
| Poor | <−85 dBM | <−10 dB | <−10 dB | <5 | <9 dB |

In step 107, the location data, altitude data, ambient condition data, and communication signal strength data is transmitted from the autonomous drones to a computing system over a communication channel. In some embodiments, the autonomous drones can be in continuous communication with one another and/or with the computing system over the communication channel, while in other embodiments the autonomous drones can travel in and out of various communication zones. While within a zone of communication, the autonomous drones can transmit the location data, altitude data, ambient condition data, communication signal strength data, etc. to the computing system continuously or at predefined intervals. In some embodiments, when the autonomous drones travel into an area of limited or no signal coverage, the autonomous drones can store the location data, altitude data, ambient condition data, and communication signal strength data generated in steps 101 through 105 for later transmission once the autonomous drones re-enter an area where there is sufficient wireless signal coverage. In exemplary embodiments, the computing reference to FIG. 9, a virtual reality headset, a projector, a display screen, or any other suitable display device.

Figure 2:
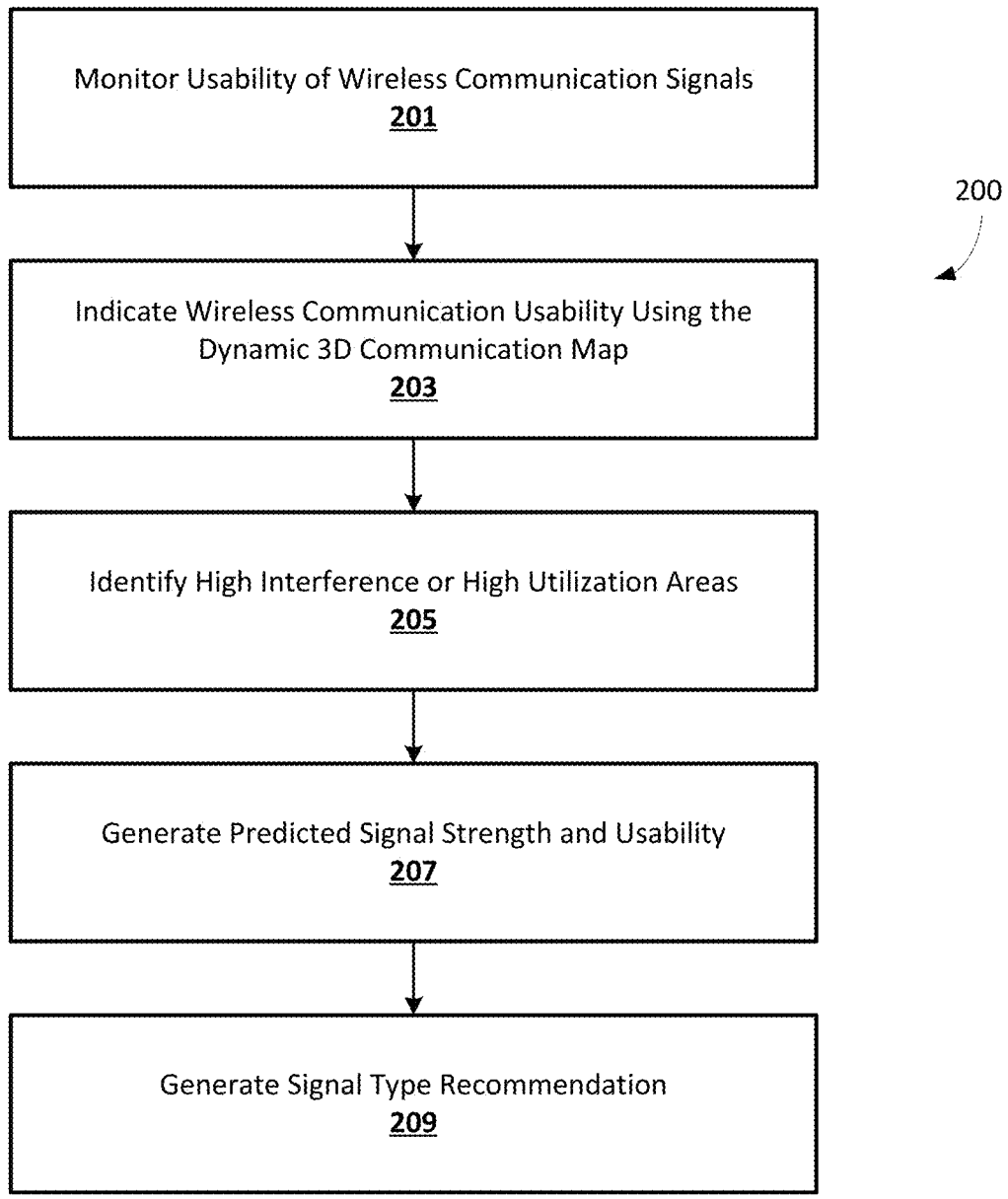
FIG. 2 is a flowchart illustrating another exemplary method for communicating with a mobile device using a master sensor, according to an exemplary embodiment.

In one embodiment, the data from the dynamic 3D communication map can be combined with usability data to generate a dynamic 3D signal usability map. FIG. 2 is a flowchart illustrating an exemplary method 200 for generating a dynamic 3D signal usability map, according to an exemplary embodiment. It will be appreciated that the method is programmatically performed, at least in part, by one or more computer-executable processes executing on, or in communication with one or more servers or computing devices such as described further below. In step 201, the usability of the one or more wireless communication signal types is monitored using the communication signal sensor, and wireless communication usability data is generated. In some embodiments, the communication sensor can be a sensor configured to measure signal quality, signal bandwidth, signal noise, etc. In exemplary embodiments, wireless communication usability can be distinguished from wireless communication signal strength. For example, a wireless signal with relatively high signal strength may have low usability due to low bandwidth or increased user traffic. Therefore, it may be beneficial to know the usability of a wireless communication signal, in addition to the strength of that signal, in order to know whether one of the autonomous drones will be able to send and receive communications. Similar to how the autonomous drones discussed above in reference to FIG. 1 detect and communicate the signal strength of wireless communication signals, the autonomous drones can also detect and transmit the usability of those wireless communication signals. In some embodiments, the autonomous drones can monitor Urchin Tracking Module (UTM) parameters, which can track wireless communication traffic, associated with vehicles and other autonomous drones within their vicinity. The autonomous drones can also, in some embodiments, use optical images to identify vehicles or other autonomous drones in particular areas and determine whether signal congestion is likely to occur.

In step 203, the data from the dynamic 3D communication map may be leveraged to indicate the wireless communication usability of the one or more wireless communication signal types based on the wireless communication usability data. Thus, a dynamic 3D wireless communication usability map can be generated, according to embodiments of the present disclosure. In some embodiments, both the wireless communication signal strength and the wireless communication usability can be visually depicted using a single dynamic 3D map. A user may be able to, in some embodiments, switch between a visual depiction of the wireless communication signal strength, as described above in reference to FIG. 1, and the wireless communication usability. In some embodiments, this 3D communication usability map can be dynamic in that it can be updated in real-time based on wireless communication usability data that is continuously received from the autonomous drones.

In step 205, the 3D map generation module determines a high interference area or a high utilization area within the dynamic 3D communication usability map. As discussed above, the usability of a wireless communication signal can be affected by a high signal utilization, increased signal interference, or other factors. Using the dynamic 3D communication usability map, various high interference or high utilization areas can be determined within the area covered by the 3D map. In some embodiments, the dynamic 3D communication usability map can identify high interference or high utilization areas by comparing traffic patterns and/or expected changes in population density at different times and locations. Knowing the communication signal usability of different areas can be helpful for navigating and setting routes for vehicles or autonomous drones so that they do not lose communication capabilities.

In step 207, a predicted signal strength is generated using a signal prediction module that includes one or more computer-executable processes. In exemplary embodiments, the predicted signal strength uses expected ambient conditions at a particular location, altitude, and time in order to programmatically compute a predicted signal strength at the particular location, altitude, and time. For example, the 3D communication map can determine that signal strength for a particular wireless signal type decreases depending on particular ambient conditions, such as snow or thunderstorms. In such an example, the signal prediction module can predict that a similar decrease in signal strength may occur during a thunderstorm that is expected to pass through the area covered by the 3D communication map. Similarly, in some embodiments, the signal prediction module can generate a predicted signal usability value based on expected ambient conditions at a particular location, altitude, and time. For example, the 3D communication map can determine that the usability of a particular wireless signal typically decreases under predetermined ambient conditions such as known traffic patterns, sporting events, etc. In such an example, the signal prediction module can predict that a particular decrease in signal usability may occur during a sporting event that is scheduled within the area covered by the 3D communication map.

In step 209, a wireless communication signal type recommendation is generated using a signal type recommendation module that includes one or more computer-executable processes. In exemplary embodiments, the wireless communication signal type recommendation can indicate which wireless communication signal type may have a strong signal at a particular time and place. The recommendation module may transmit the recommendation to one or more autonomous drones that have been configured to accept the recommendation while they are in transit. In other embodiments, the wireless communication signal type recommendation can indicate which wireless communication signal type may have strong usability at a particular time and place.

Figure 3:
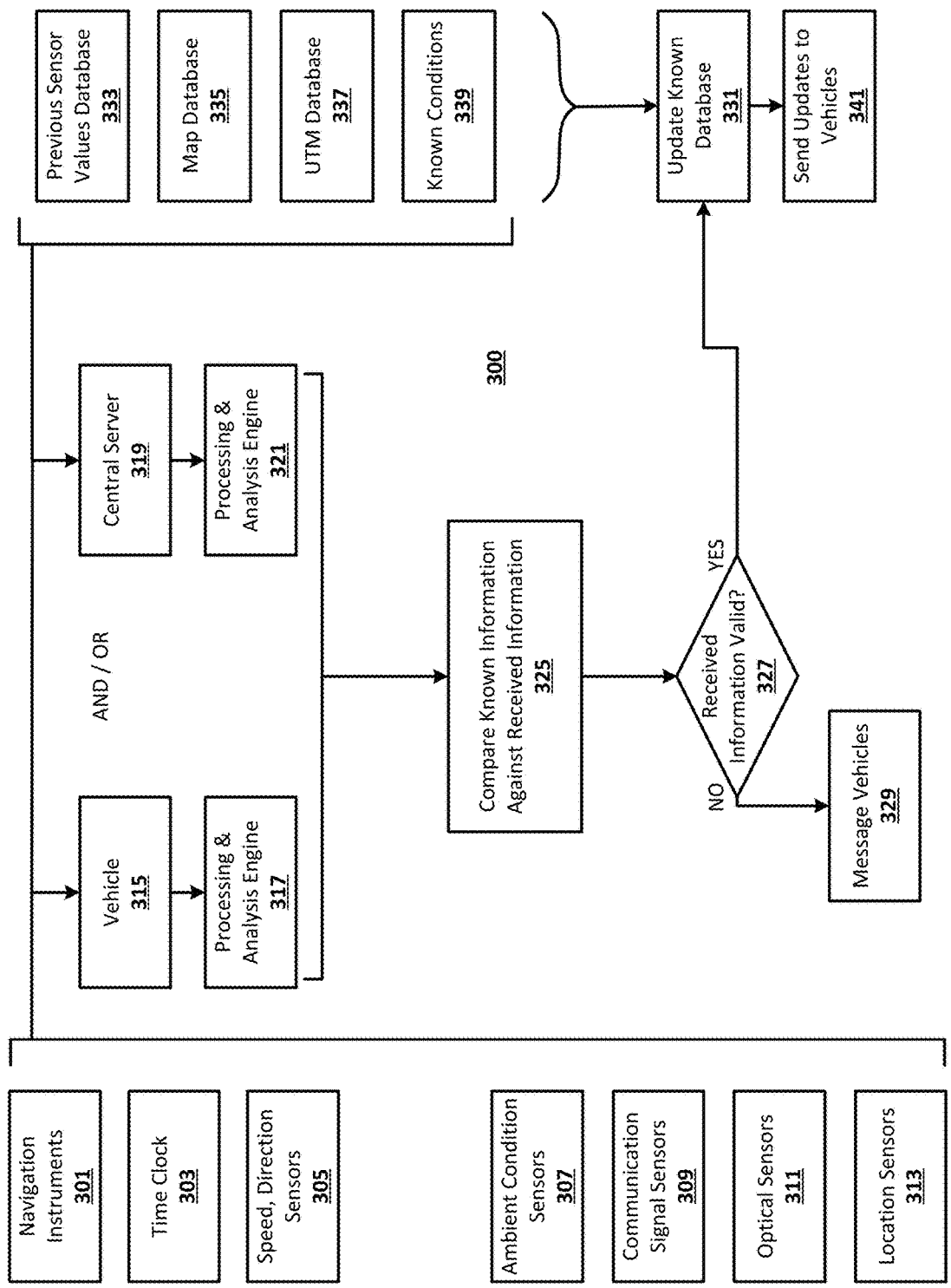
FIG. 3 is a flowchart illustrating an exemplary method for processing data used in dynamically generating a 3D communication map, according to an exemplary embodiment.

FIG. 3 is a flowchart illustrating an exemplary method 300 for processing data used in dynamically generating a 3D communication map, according to an exemplary embodiment. It will be appreciated that the method is programmatically performed, at least in part, by one or more computer-executable processes executing on, or in communication with one or more servers or other computing devices such as described further below. In this example embodiment, real-time vehicle analysis of a vehicle, such as an autonomous drone, can be performed using navigation instruments 301, the time clock 303 associated with the autonomous drone, and speed and direction sensors 305. In addition, various sensors associated with the autonomous drone can collect data while the autonomous drone is completing a route. These sensors can include, for example, ambient condition sensors 307, communication signal sensors 309 configured to monitor the communication signal strength and communication signal usability, optical sensors 311, and location sensors 313. Optical sensors can include, for example, cameras, laser sensors, IR sensors, etc. In some embodiments, optical sensors can be used to identify weather patterns, vehicle density, or other structural features and obstacles.

The information gathered from the sensors 307, 309, 311, and 313, as well as the navigation instruments 301, time clock 303, and speed and direction sensors 305 can be compared against known input values in order to generate and update information used to generate the 3D communication map. Known values can be collected, for example, from a database 333 of previous sensor values, a map database 335 including information collected from various types of maps or mapping software, a Unified Threat Management (UTM) database 337, and known conditions database 339 such as known or weather and time data. These known values from databases 333-339 can be compared against the dynamically received values from the sensors 305-313, the navigation instruments, and the time clock 303. In some embodiments, the processing of this comparison can be performed by a processing and analysis engine 317 associated with the vehicle 315 or by a processing and analysis engine 321 associated with the central server 319. In both cases, the processing and analysis engine 317 and 321 may include one or more computer-executable processes. In alternative embodiments, the processing can be distributed between both the vehicle 315 and the central server 319. In some embodiments, if the vehicle 315 is overloaded and does not have available processing power, the processing and analysis engine 321 associated with the central server 319 can perform the comparison described above.

At 325, the known information from databases 333-339 is compared against the dynamically received information received from elements 301-313. In some embodiments, the received information can be determined to be invalid if it is too far from a known value, and therefore considered an outlier. If the received information is determined in 327 to be invalid, the appropriate vehicle from which the invalid information was received may be messaged at 329 in order to notify the vehicle that it collected an invalid data point. If the information is valid, the known database is updated 331, and the updates are sent to the vehicles 341.

Figure 4:
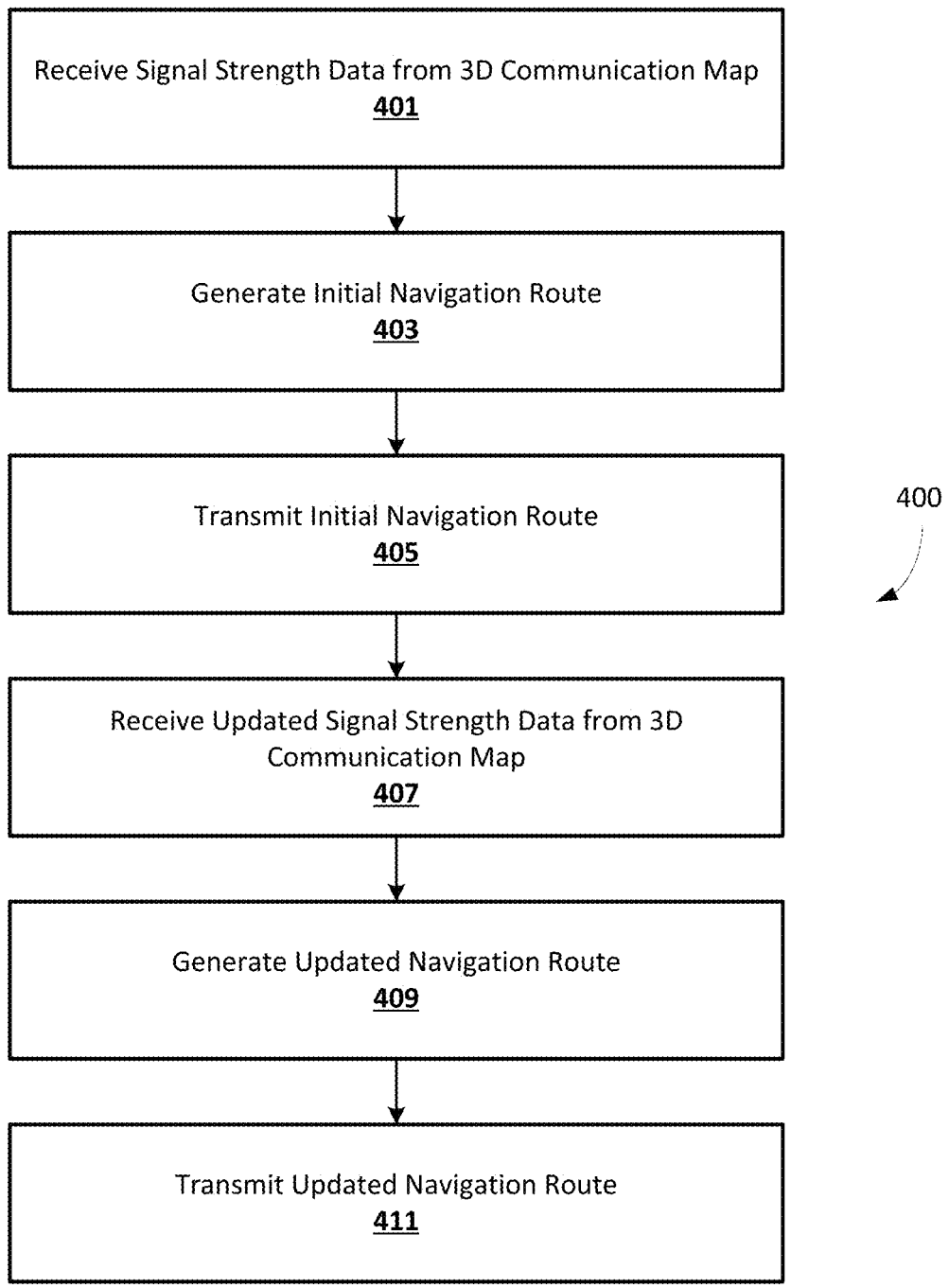
FIG. 4 is a flowchart illustrating an exemplary method for generating and updating navigation routes, according to an exemplary embodiment.

FIG. 4 is a flowchart illustrating an exemplary method 400 for generating and updating navigation routes, according to an exemplary embodiment. It will be appreciated that the method is programmatically performed, at least in part, by one or more computer-executable processes executing on, or in communication with one or more servers or other computing devices such as described further below. In step 401, wireless communication signal strength data is received from a dynamic 3D communication map. The wireless communication signal strength data can indicate a first low signal strength zone, and the dynamic 3D communication map can be generated as discussed above, in some embodiments. The wireless communication usability data can also indicate a low wireless communication usability zone, in some embodiments.

In step 403, an initial navigation route is generated based on the wireless communication signal strength data received from the dynamic 3D communication map by a vehicle route generation module that includes one or more computer-executable processes. In some embodiments, the initial navigation route can also be generated based on the wireless communication usability data received from the dynamic 3D communication map. The initial navigation route can be configured, in some embodiments, to guide a robotic vehicle, such as an autonomous drone, to travel along a predetermined route in order to avoid a first low signal strength zone or a low signal usability zone.

In step 405, the initial navigation route is transmitted to the autonomous drone. In some embodiments, the initial navigation route can be transmitted directly to the autonomous drone from a computing system, or via a relayed communication path as discussed in more detail below.

In step 407, updated wireless communication signal strength data is received from the dynamic 3D communication map by the vehicle route generation module. The updated wireless communication signal strength data can include, for example, a second low signal strength zone. In some embodiments, updated wireless communication signal usability data is also received indicating a second low signal usability zone.

In step 409, an updated navigation route is generated by the vehicle route generation module based on the updated wireless communication signal strength data received in step 407. The updated navigation route is configured to guide the autonomous drone to avoid the second low signal strength zone. In some embodiments, the updated navigation route is also configured to guide the autonomous drone to avoid a low wireless communication signal usability zone.

In step 411, the updated navigation route is transmitted to the autonomous drone. In some embodiments, the updated navigation route can be transmitted to the autonomous drone using a communication route generated according to the techniques described in this disclosure.

Figure 5:
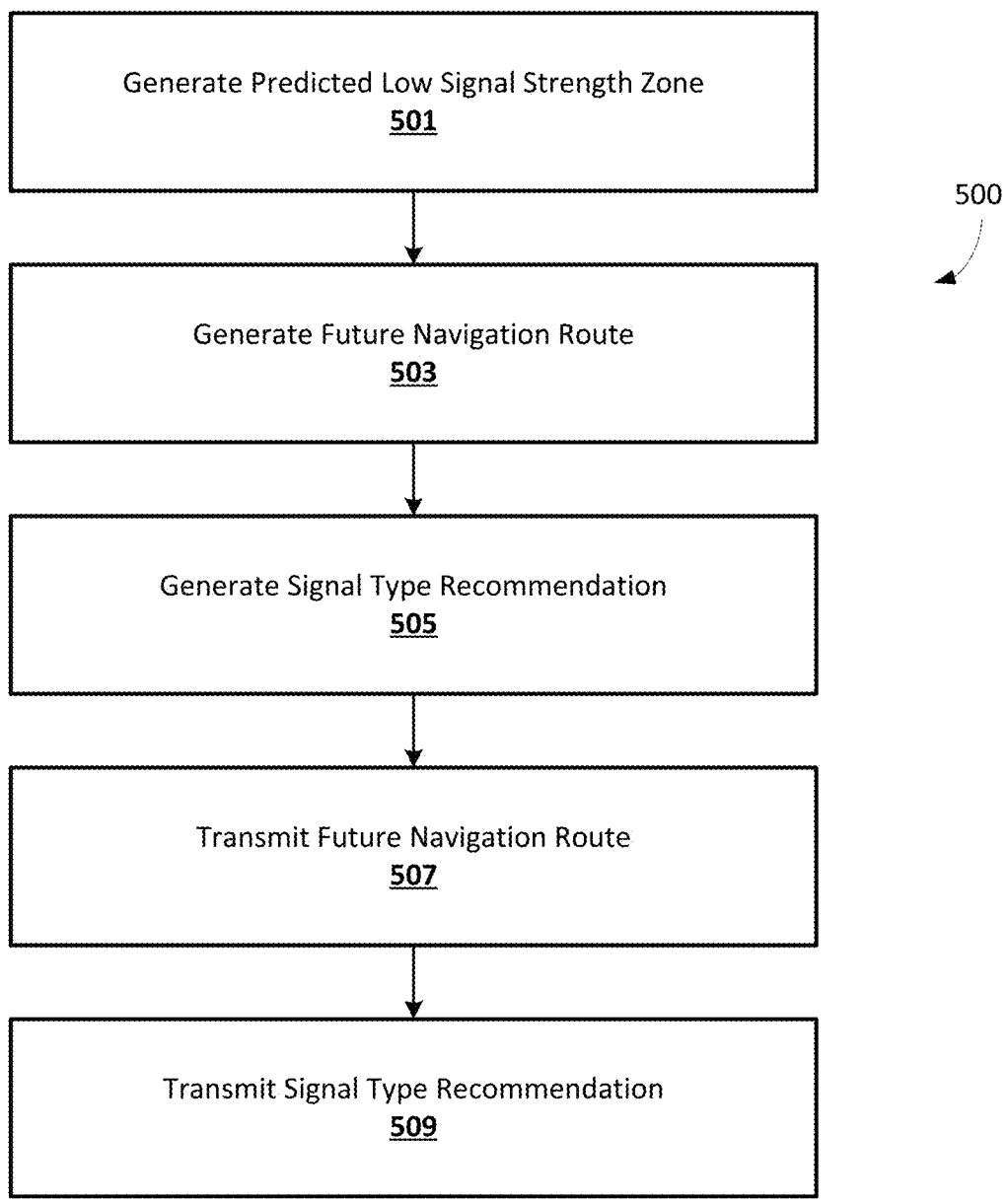
FIG. 5 is a flowchart illustrating an exemplary method for generating navigation routes and communication recommendations, according to an exemplary embodiment.

FIG. 5 is a flowchart illustrating an exemplary method 500 for generating navigation routes and communication recommendations, according to an exemplary embodiment. It will be appreciated that the method is programmatically performed, at least in part, by one or more computer-executable processes executing on, or in communication with one or more servers or computing devices such as described further below. In step 501, a signal prediction module generates a prediction of a future low signal strength zone at a particular location and time, based at least in part on expected ambient conditions at the particular location and time. For example, the signal prediction module can determine that signal strength for a particular wireless signal type decreases depending on particular ambient conditions, such as snow or thunderstorms. In such an example, the signal prediction module can predict that a similar decrease in signal strength may occur during a thunderstorm that is expected to pass through the area covered by the 3D communication map as determined by accessing publicly available or private weather data. Similarly, in some embodiments, the signal prediction module can generate a predicted signal usability value based on expected ambient conditions at a particular location, altitude, and time. For example, the signal prediction module can determine that the usability of a particular wireless signal typically decreases under predetermined ambient conditions such as known traffic patterns, sporting events, etc. In such an example, the signal prediction module can predict that a particular decrease in signal usability may occur during a sporting event that is scheduled within the area covered by the 3D communication map.

In step 503, the vehicle route generation module generates a future navigation route configured to guide the autonomous drone to avoid the future low signal zone at the particular location and time. In some embodiments, the future navigation route can also be configured to guide the autonomous drone to avoid a future low signal usability zone calculated in step 501.

In step 505, a signal type recommendation module generates a signal type recommendation configured to prompt the autonomous drone to utilize a particular wireless communication signal type in order to avoid a low signal strength zone associated with only one type of wireless communication signal type. For example, the signal type recommendation may prompt the autonomous drone to utilize a cellular connection while passing through an area where the WiFi signal is expected to be weak. In some embodiments, the signal type recommendation can also be configured to prompt the autonomous drone to utilize a particular signal type in order to avoid a low signal usability zone associated with one or more particular signal types.

In step 507, the future navigation route is transmitted to the autonomous drone; and in step 509 the signal type recommendation is transmitted to the autonomous drone. In some embodiments, the future navigation route and/or the signal type recommendation can be transmitted to the autonomous drone via a relayed communication route as described herein.

Figure 6:
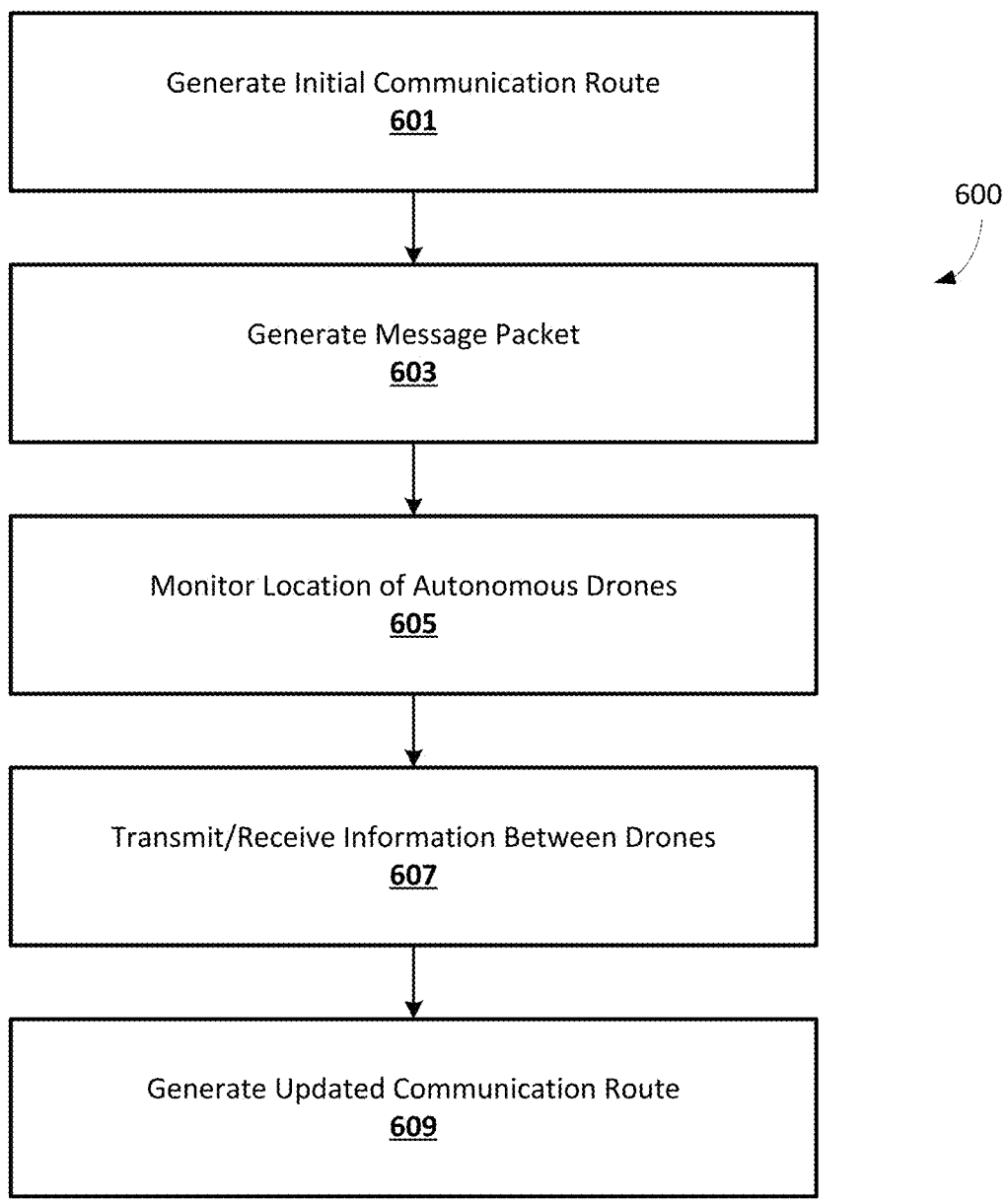
FIG. 6 is a flowchart illustrating an exemplary method for relaying communications using autonomous drones, according to an exemplary embodiment.

FIG. 6 is a flowchart illustrating an exemplary method 600 for relaying communications using autonomous drones, according to an exemplary embodiment. It will be appreciated that the method is programmatically performed, at least in part, by one or more computer-executable processes executing on, or in communication with one or more servers or computing devices such as described further below. In step 601, an initial communication route module that includes one or more computer-executable processes generates an initial communication route from an initial location to a destination location. The initial communication route is configured to route a message packet via a first subset of available autonomous drones in order to reach the destination location. In some embodiments, the initial communication route is generated based on signal strength or battery life associated with each of a first subset of autonomous drones.

In step 603, the message packet is generated including a message, the final destination, the initial communication route, and communication route update rules by which the autonomous drones may dynamically update the communication route. In some embodiments, the communication route update rules can prompt a communication route update module that includes one or more computer-executable processes executing on an autonomous drone to update the initial communication route in response to a change in signal strength between the first subset of autonomous drones in the communication route. In other embodiments, the initial communication route can be updated in response to a change in battery life for one of the autonomous drones in the communication route, a change in location for one or more of the autonomous drones in the communication route, or an unsuccessful authentication between two or more of the autonomous drones in the communication route.

In step 605, a location sensor associated with each of the autonomous drones monitors the location of each of the autonomous drones and generates location data. In some embodiments, this location data can be used to track the location of each autonomous drone and determine which autonomous drones are available to receive and relay communication messages over which areas.

In step 607, information is transmitted and received between the autonomous drones using a communication module that includes one or more computer-executable processes and is associated with each of the autonomous drones. The information transmitted and received includes the message packet generated in step 603. In some embodiments, each autonomous drone can be configured with a separate communications processor dedicated to receiving and relaying the message packets in order to maintain the navigational function of each drone separately from the communication relay functions.

In step 609, a communication route update module associated with one of the autonomous drones generates an updated communication route in response to dynamic changes in signal strength and the location data associated with one or more of the first subset of autonomous drones. The updated communication route can relay the message packet through a second subset of autonomous drones in order to reach the destination location. In some embodiments, the updated communication route is configured to relay the message packet to avoid a low signal strength zone or a low signal usability zone, as described herein.

Figure 7:
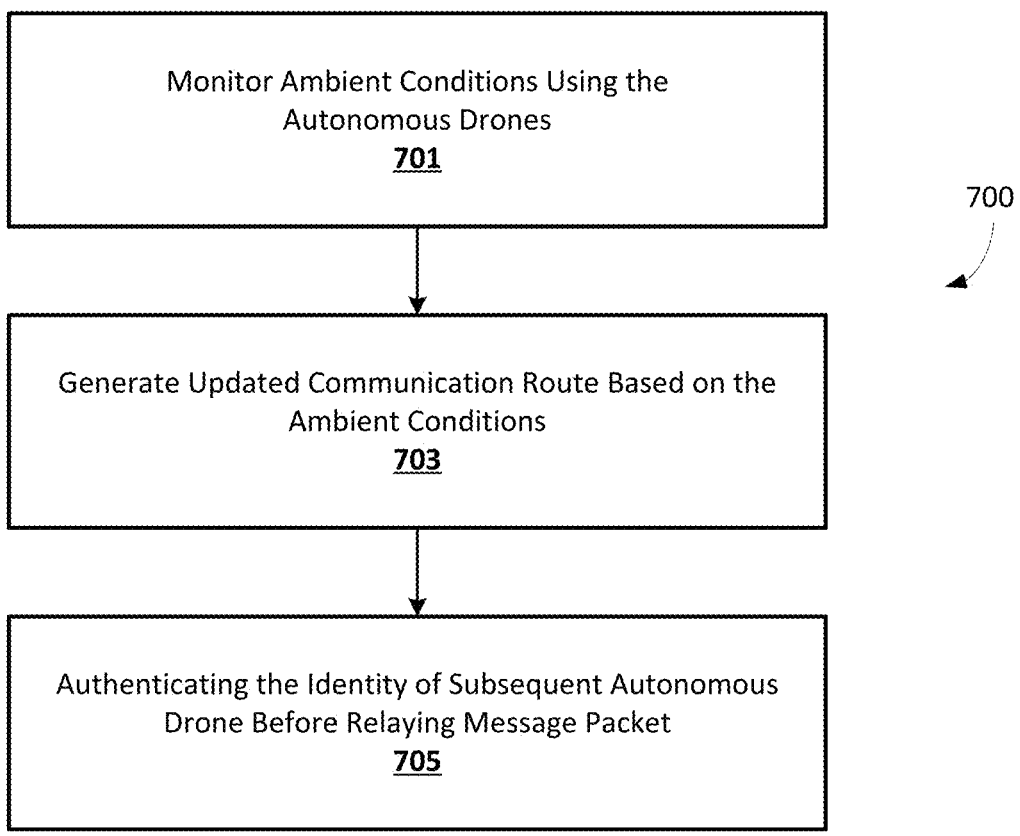
FIG. 7 is a flowchart illustrating an exemplary method for generating communication routes for autonomous drones, according to an exemplary embodiment.

FIG. 7 is a flowchart illustrating an exemplary method 700 for generating communication routes for autonomous drones, according to an exemplary embodiment. It will be appreciated that the method is programmatically performed, at least in part, by one or more computer-executable processes executing on, or in communication with one or more servers or computing devices such as described further below. In step 701, an ambient condition sensor, such as the sensors described above, monitors the ambient conditions proximal to an autonomous drone and generates ambient condition data. In some embodiments, the ambient condition data includes temperature data, humidity data, seasonal data, vegetation growth data, population density data, etc.

In step 703, an updated communication route is generated based on the ambient condition data generated in step 701. The updated communication route can be generated, in some embodiments, using a communication route updated module associated with one of the autonomous drones. In some embodiments, the ambient condition data can indicate an area of reduced signal strength, an area of reduced signal usability, or a high interference area, and the updated communication route can direct the communication along an updated route to avoid one or more of those areas.

In step 705, an authentication module associated with one of the autonomous drones authenticates the identity of a subsequent autonomous drone in the communication route before relaying the message packet to the subsequent autonomous drone. In some embodiments, authenticating the identity of the subsequent autonomous drone includes using a first blockchain key and a second blockchain key configured to facilitate confirming the identity of the subsequent autonomous drone.

Figure 8:
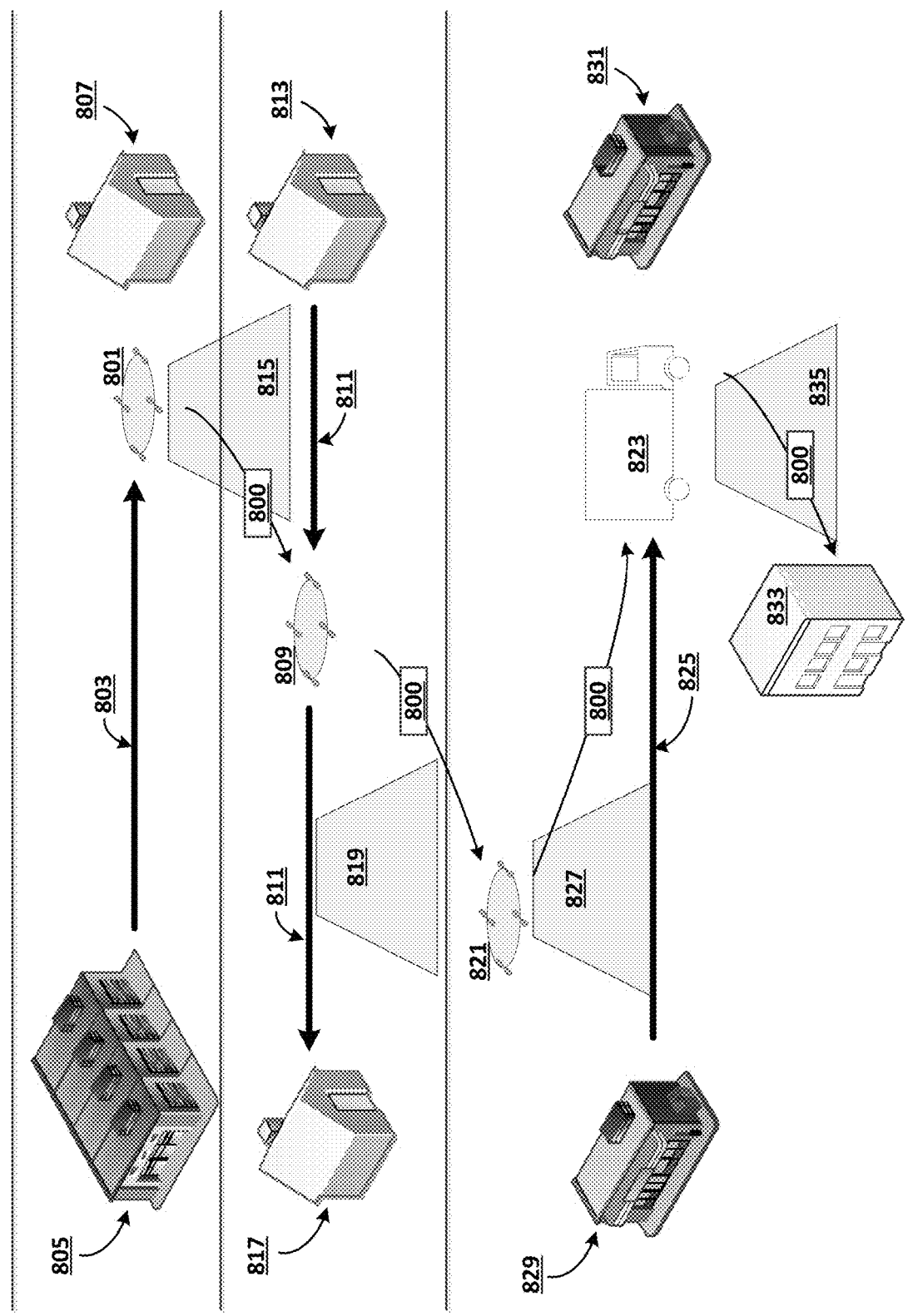
FIG. 8 is a chart of an example communication route, according to an exemplary embodiment.

FIG. 8 is a chart of an example communication route 800, according to an exemplary embodiment. In this particular embodiment, the communication route 800 involves relaying a message between a first autonomous drone 801 to a final computing system 833 through two additional autonomous drones 809 and 821, and a ground vehicle 823. As can be seen in this example embodiment, the first autonomous drone 801 is configured to travel along a first route 803 between an origin destination 805 and a first residence 807. In some embodiments, the first route 803 can be calculated according to the techniques described above in order to ensure that the first autonomous drone avoids areas of low signal strength and/or low signal usability. The first autonomous drone 801 can be a delivery drone configured to deliver a product to the first residence 807, in some embodiments. For a certain period of time while the first autonomous drone 801 is near the first residence 807, it is within a first communication window 815. In this example embodiment, a second autonomous drone 809 is also within the first communication window 815 and can receive a message packet along the communication route 800 while the second autonomous drone 809 is traveling along the second route 811 between a second residence 813 and a third residence 817.

Once the second autonomous drone 809 has received the message packet from the first autonomous drone 801, it can continue along the second route 811 toward the third residence 817. Once the second autonomous drone 809 is near the second residence 817, it passes within a second communication window 819, where it can relay the message packet to the third autonomous drone 821. In this particular embodiment, the third autonomous drone 821 is remaining stationary near the second communication window 819 for a period of time, and can relay the message packet along the communication route 800 to a ground vehicle 823 while the ground vehicle passes through a third communication window 827. In this example embodiment, the ground vehicle 823 can be an autonomous vehicle configured to travel along a third route 825 between a first business location 829 and a second business location 831. As the ground vehicle 823 travels along the third route 825 and approaches the second business location 831, it passes within a fourth communication window 835 where the ground vehicle 825 can relay the message packet along the final segment of the communication route 800 to the computing system 833. According to an example embodiment, if the third autonomous drone 821 were to lose power and not be able to relay the message packet along the communication route 800, another autonomous drone within the third communication window 827 could be chosen to take the place of the third autonomous drone 821, thus creating an updated communication route. In some embodiments, the computing system 833 can store the drone flight paths, message queue, location data associated with each vehicle and/or drone, and the time delay between each message relay step in order to calculate the communication route.

Figure 9:
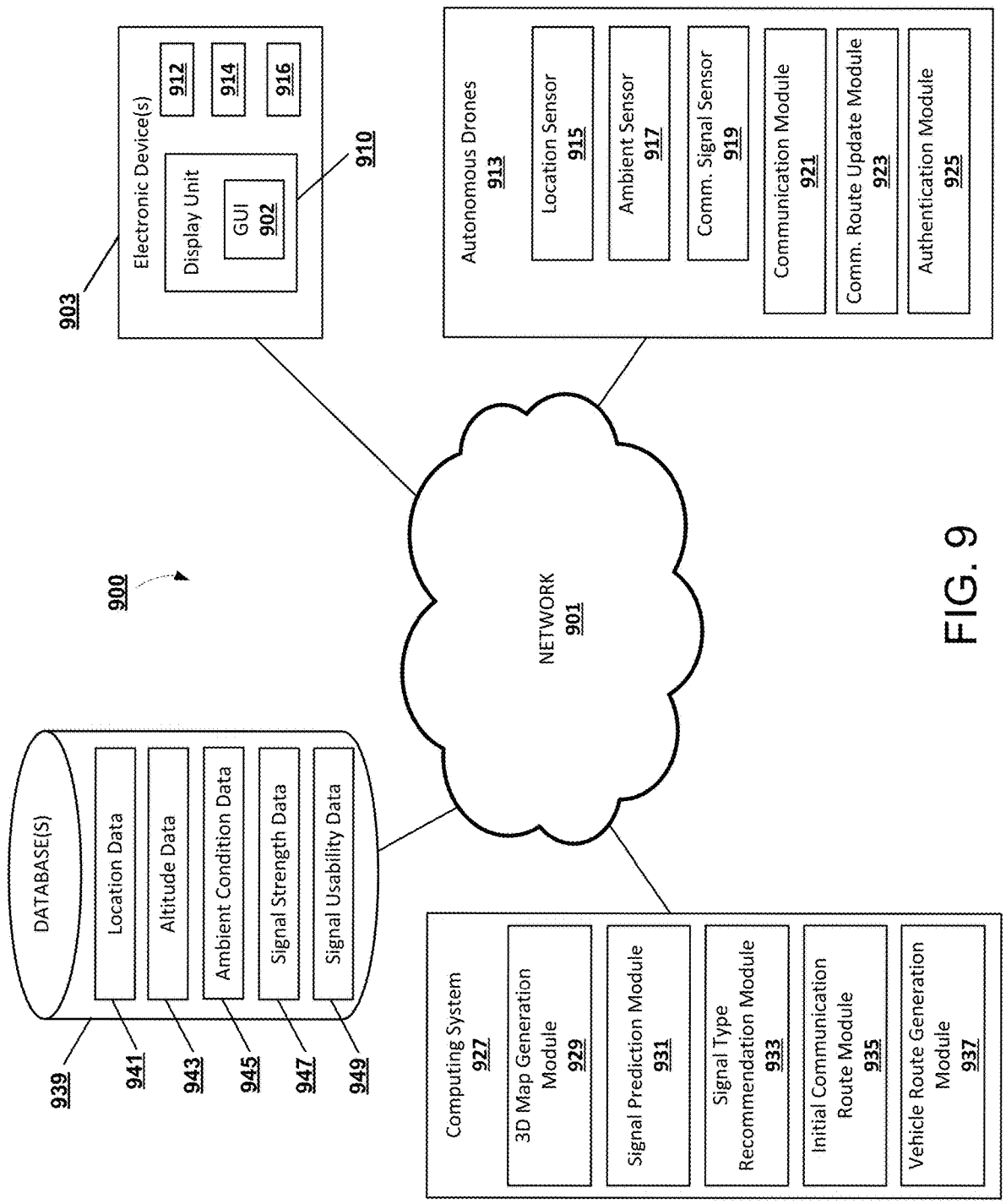
FIG. 9 is a diagram of an exemplary network environment suitable for a distributed implementation of an exemplary embodiment.

FIG. 9 illustrates a network diagram depicting a system 900 suitable for a distributed implementation of an exemplary embodiment. The system 900 can include a network 901, an electronic device 903, a computing system 927, a database 939, and a number of autonomous drones 913. In exemplary embodiments, each of the autonomous drones 913 includes a location sensor 915, an ambient sensor 917, a communication signal sensor 919, a communication module 921, a communication route update module, 923, and an authentication module 925. Each one of a plurality of autonomous drones 913 can be in communication with the computing system 927 and with each other over the network 901. As will be appreciated, various distributed or centralized configurations may be implemented without departing from the scope of the present invention. In exemplary embodiments, the communication module 921, communication route update module 923, and the authentication module 925 can implement one or more of the processes described herein, or portions thereof. In some embodiments, the computing system 927 can store and execute a 3D map generation module 929, a signal prediction module 931, a signal type recommendation module 933, an initial communication route module 935, and a vehicle route generation module 937 which can implement one or more of the processes described herein, or portions thereof. It will be appreciated that the module functionality may be implemented as a greater number of modules than illustrated and that the same server, computing system, or autonomous drone could also host multiple modules. The database 939 can store the location data 941, altitude data 943, ambient condition data 945, signal strength data 947, and signal usability data 949, as discussed herein. In some embodiments, the 3D map generation module 929 can generate a dynamic 3D communication signal strength map and/or a dynamic 3D communication signal usability map and communicate with the electronic device 903 in order to render the dynamic 3D map using a display unit 910.

In exemplary embodiments, the electronic device 903 may include a display unit 910, which can display a GUI 902 to a user of the electronic device 903. The electronic device can also include a memory 912, processor 914, and a wireless interface 916. In some embodiments, the electronic device 903 may include, but is not limited to, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, multi-processor systems, microprocessor-based or programmable consumer electronics, game consoles, network PCs, mini-computers, smartphones, and the like.

The electronic device 903, autonomous drones 913, and the computing system 927 may connect to the network 901 via a wireless connection, and the electronic device 903 may include one or more applications such as, but not limited to, a web browser, a sales transaction application, a geo-location application, and the like. The computing system 927 may include some or all components described in relation to computing device 1000 shown in FIG. 10.

The communication network 901 may include, but is not limited to, the Internet, an intranet, a LAN (Local Area Network), a WAN (Wide Area Network), a MAN (Metropolitan Area Network), a wireless network, an optical network, and the like. In one embodiment, the electronic device 903, autonomous drones 913, computing system 927, and database 939 can transmit instructions to each other over the communication network 901. In exemplary embodiments, the location data 941, altitude data 943, ambient condition data 945, signal strength data 947, and signal usability data 949 can be stored at the database 939 and received at the electronic device 903, autonomous drones 913, or the computing system 927 in response to a service performed by a database retrieval application.

Figure 10:
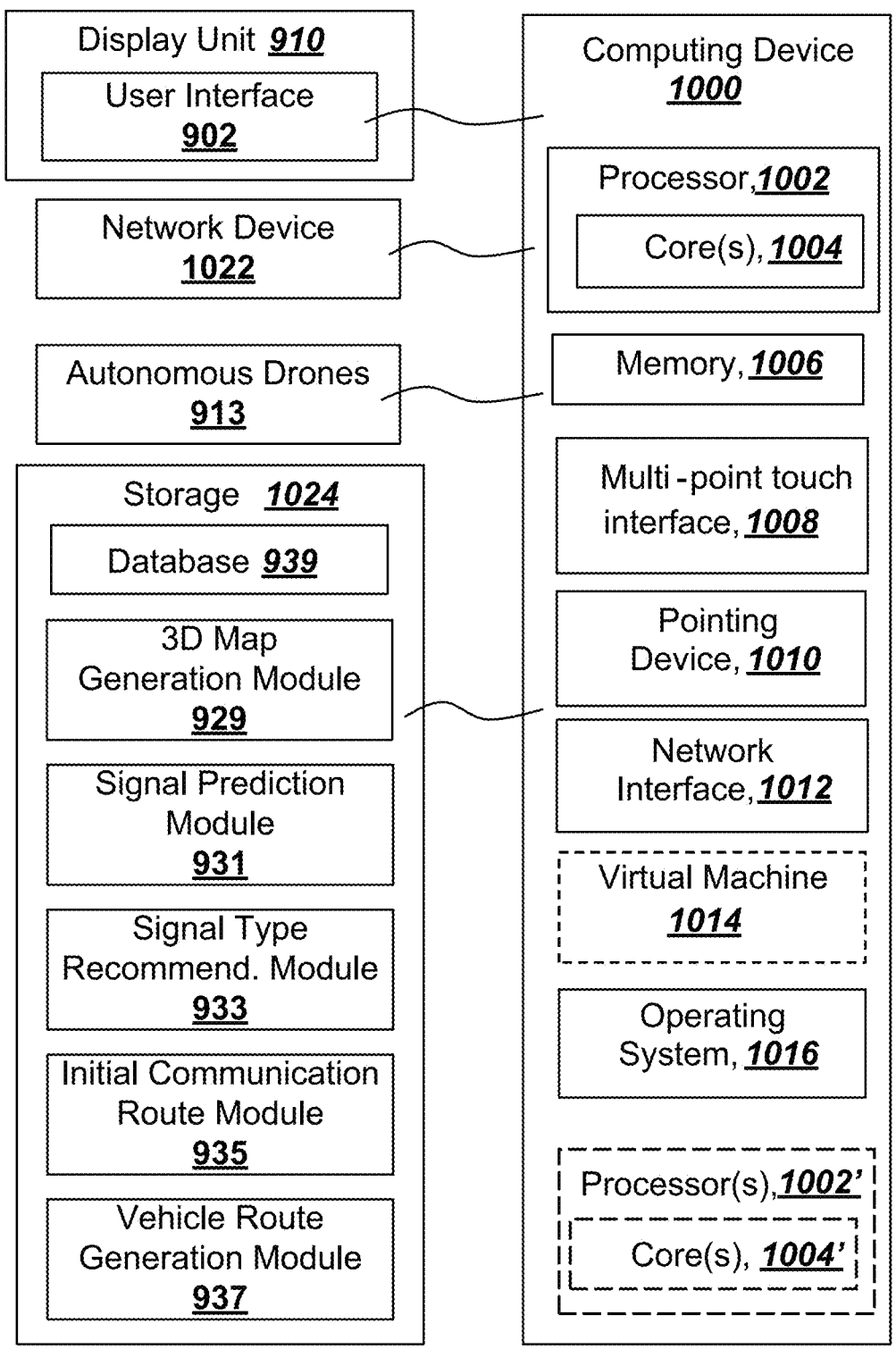
FIG. 10 is a block diagram of an exemplary computing device that can be used to perform exemplary processes in accordance with an exemplary embodiment.

FIG. 10 is a block diagram of an exemplary computing device 1000 that can be used in the performance of the methods described herein. The computing device 1000 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 1006 included in the computing device 1000 can store computer-readable and computer-executable instructions or software for implementing exemplary embodiments and programmed to perform processes described above in reference to FIGS. 1-7. The computing device 1000 also includes processor 1002 and associated core 1004, and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' can each be a single core processor or multiple core (1004 and 1004') processor.

Virtualization can be employed in the computing device 1000 so that infrastructure and resources in the computing device can be shared dynamically. A virtual machine 1014 can be provided to handle a process running on multiple processors so that the process appears to be using only one computing resource rather than multiple computing resources. Multiple virtual machines can also be used with one processor.

Memory 1006 can be non-transitory computer-readable media including a computer system memory or random access memory, such as DRAM, SRAM, EDO RAM, and the like. Memory 1006 can include other types of memory as well, or combinations thereof.

A user can interact with the computing device 1000 through a display unit 910, such as a touch screen display or computer monitor, which can display one or more user interfaces 902 that can be provided in accordance with exemplary embodiments. In some embodiments, the display unit 910 can also display the dynamic 3D communication map disclosed herein. The computing device 1000 can also include other I/O devices for receiving input from a user, for example, a keyboard or any suitable multi-point touch interface 1008, a pointing device 1010 (e.g., a pen, stylus, mouse, or trackpad). The multi-point touch interface 1008 and the pointing device 1010 can be coupled to the display unit 910. The computing device 1000 can include other suitable conventional I/O peripherals.

The computing device 1000 can also include one or more storage devices 1024, such as a hard-drive, CD-ROM, or other non-transitory computer readable media, for storing data and computer-readable instructions and/or software, such as a 3D map generation module 929, signal prediction module 931, signal type recommendation module 933, initial communication route module 935, and vehicle route generation module 937 that can implement exemplary embodiments of the methods and systems as taught herein, or portions thereof. Exemplary storage device 1024 can also store one or more databases 939 for storing any suitable information required to implement exemplary embodiments. The database 939 can be updated by a user or automatically at any suitable time to add, delete, or update one or more items in the databases. Exemplary storage device 1024 can store a database 939 for storing the location data 941, altitude data 943, ambient condition data 945, signal strength data 947, signal usability data 949, and any other data/information used to implement exemplary embodiments of the systems and methods described herein.

The computing device 1000 can also be in communication with the autonomous drones 913. In exemplary embodiments, the computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 can include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 can run operating system 1016, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or other operating systems capable of running on the computing device and performing the operations described herein. In exemplary embodiments, the operating system 1016 can be run in native mode or emulated mode. In an exemplary embodiment, the operating system 1016 can be run on one or more cloud machine instances.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in many computing languages.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with multiple elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for generating a dynamic 3D communication map, the system comprising:
   a plurality of autonomous drones configured to travel along predetermined routes, each one of the plurality of autonomous drones including:
      a location sensor configured to monitor the location and altitude of the autonomous drone and generate location data and altitude data;
      an ambient condition sensor configured to monitor ambient conditions, including weather data and geographical and structural features located along the predetermined routes, and generate ambient condition data;
      a communication signal sensor configured to:
         monitor a signal strength of one or more wireless communication signal types and generate communication signal strength data; and
         monitor signal usability of the one or more wireless communication signal types and generate wireless communication usability data; and
      a wireless communication device configured to transmit location data, altitude data, ambient condition data, and communication signal strength data; and
   a computing system in communication with the plurality of autonomous drones over a communication channel and configured to execute a 3D map generation module to:
      dynamically receive location data, altitude data, ambient condition data, and communication signal strength data from each wireless communication device;
      store the location data, altitude data, ambient condition data, and communication signal strength data in a database;
      generate a dynamic 3D communication map indicating the signal strength for each of the one or more wireless communication signal types as a function of the location data, altitude data, and ambient condition data, generate a dynamic 3D wireless communication usability map based on the wireless communication usability data;

execute a signal prediction module to generate a predicted signal strength at a particular location, altitude and time based on expected ambient conditions at the particular location, altitude and time;

execute the signal prediction module to generate a predicted signal usability value at the predicted location, altitude and time based on the wireless communication usability data; and transmit instructions regarding a communication route in which a set of autonomous drones relay a message packet from an initial location to a destination location, each autonomous drone in the set transmitting and/or receiving the message packet from another autonomous drone in the set;

wherein a transmitting autonomous drone is configured to transmit the message packet to a receiving autonomous drone when both the transmitting and receiving autonomous drones are within a communication window determined by the dynamic 3D communication map.

2. The system of claim 1, wherein the wireless communication usability data is based on one or more of communication traffic and optical images.

3. The system of claim 1, wherein the dynamic 3D communication map and the dynamic 3D wireless communication usability map are incorporated into a single map.

4. The system of claim 3, wherein the single map indicates at least one of the signal strength and the wireless communication usability for each of the one or more wireless communication signal types as a function of a communication signal configuration.

5. The system of claim 1, wherein the ambient condition data includes at least one of temperature data, humidity data, seasonal data, vegetation growth data, and population density data.

6. The system of claim 1, wherein the computing system is further configured to determine at least one of a high interference area or a high utilization area within the dynamic 3D communication map.

7. The system of claim 1, wherein the computing system is further configured to execute a signal type recommendation module to generate a wireless communication signal type recommendation indicating which wireless communication signal type may have a strong signal at a particular time and place.

8. The system of claim 7, wherein the signal type recommendation module is further configured to transmit the wireless communication signal type recommendation indicating which wireless communication signal type may have a strong signal at a particular time and place to one or more of the plurality of autonomous drones.

9. The system of claim 1, wherein signal usability is a function of one or more of signal quality, signal bandwidth, and signal noise.

10. A method for generating a dynamic 3D communication map, the method comprising:

monitoring a location and altitude of each of a plurality of autonomous drones configured to travel along predetermined routes and generating location and altitude data using location sensors associated with the plurality of autonomous drones;

monitoring ambient conditions, including weather data and geographical and structural features located along the predetermined routes, and generating ambient condition data using ambient condition sensors associated with the plurality of autonomous drones;

monitoring a signal strength of one or more wireless communication signal types and generating communication signal strength data using communication signal sensors associated with the plurality of autonomous drones;

monitoring signal usability of the one or more wireless communication signal types and generating wireless communication usability data;

transmitting the location data, altitude data, ambient condition data, and communication signal strength data from the plurality of autonomous drones to a computing system in communication with the plurality of autonomous drones over a communication channel;

storing the location data, altitude data, ambient condition data, and communication signal strength data in a database;

generating a dynamic 3D communication map indicating the signal strength for each of the one or more wireless communication signal types as a function of the location data, altitude data, and ambient condition data;

generating a dynamic 3D wireless communication usability map based on the wireless communication usability data;

generating, based on a signal prediction module, a predicted signal strength at a particular location, altitude and time based on expected ambient conditions at the particular location, altitude and time;

generating, based on the signal prediction module, a predicted signal usability value at the predicted location, altitude and time based on the wireless communication usability data; and transmitting instructions regarding a communication route in which a set of autonomous drones relay a message packet from an initial location to a destination location, each autonomous drone in the set transmitting and/or receiving the message packet from another autonomous drone in the set;

wherein a transmitting autonomous drone is configured to transmit the message packet to a receiving autonomous drone when both the transmitting and receiving autonomous drones are within a communication window determined by the dynamic 3D communication map.

11. The method of claim 10, wherein the wireless communication usability data is based on one or more of communication traffic and optical images.

12. The method of claim 10, wherein the dynamic 3D communication map and the dynamic 3D wireless communication usability map are incorporated into a single map, and wherein the single map indicates at least one of the signal strength and the wireless communication usability for each of the one or more wireless communication signal types as a function of a communication signal configuration.

13. The method of claim 10, wherein the ambient condition data includes at least one of temperature data, humidity data, seasonal data, vegetation growth data, or population density data.

14. The method of claim 10, further comprising:

determining at least one of a high interference area or a high utilization area within the dynamic 3D communication map.

15. The method of claim 10, further comprising:
generating a wireless communication signal type recommendation indicating which wireless communication signal type may have a strong signal at a particular time and place.

16. The method of claim 10, further comprising:
transmitting the wireless communication signal type recommendation indicating which wireless communication signal type may have a strong signal at a particular time and place to one or more of the plurality of autonomous drones.

17. A non-transitory machine readable medium storing instructions for generating a dynamic 3D communication map, wherein execution of the instructions causes one or more processing devices to:
monitor a location and altitude of each of a plurality of autonomous drones configured to travel along predetermined routes and generating location and altitude data using location sensors associated with the plurality of autonomous drones;
monitor ambient conditions, including weather data and geographical and structural features located along the predetermined routes, and generating ambient condition data using ambient condition sensors associated with the plurality of autonomous drones;
monitor a signal strength of one or more wireless communication signal types and generating communication signal strength data using communication signal sensors associated with the plurality of autonomous drones;
monitor a signal usability of the one or more wireless communication signal types and generating wireless communication usability data;
transmit the location data, altitude data, ambient condition data, and communication signal strength data from the plurality of autonomous drones to a computing system in communication with the plurality of autonomous drones over a communication channel;
store the location data, altitude data, ambient condition data, and communication signal strength data in a database;
generate a dynamic 3D communication map indicating the signal strength for each of the one or more wireless communication signal types as a function of the location data, altitude data, and ambient condition data;
generate a dynamic 3D wireless communication usability map based on the wireless communication usability data;
generate, based on a signal prediction module, a predicted signal strength at a particular location, altitude and time based on expected ambient conditions at the particular location, altitude and time; and
generate, based on the signal prediction module, a predicted signal usability value at the predicted location, altitude and time based on the wireless communication usability data; and
transmitting instructions regarding a communication route in which a set of autonomous drones relay a message packet from an initial location to a destination location, each autonomous drone in the set transmitting and/or receiving the message packet from another autonomous drone in the set;
wherein a transmitting autonomous drone is configured to transmit the message packet to a receiving autonomous drone when both the transmitting and receiving autonomous drones are within a communication window determined by the dynamic 3D communication map.

18. The non-transitory machine readable medium of claim 17, wherein the wireless communication usability data is based on one or more of communication traffic and optical images.

19. The non-transitory machine readable medium of claim 17, wherein signal usability is a function of one or more of signal quality, signal bandwidth, and signal noise.

\* \* \* \* \*